US012542729B2

(12) United States Patent
Rodriguez et al.

(10) Patent No.: US 12,542,729 B2
(45) Date of Patent: Feb. 3, 2026

(54) AUTOMATED PROCESS FLOW TESTING SYSTEM

(71) Applicant: Toshiba Global Commerce Solutions, Inc., Durham, NC (US)

(72) Inventors: Adrian Rodriguez, Durham, NC (US); Jessica K. Snead, Cary, NC (US); Lucas Blanck, Durham, NC (US); Jonathan Waite, Apex, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 0 days.

(21) Appl. No.: 18/222,670

(22) Filed: Jul. 17, 2023

(65) Prior Publication Data

US 2023/0379235 A1 Nov. 23, 2023

Related U.S. Application Data

(63) Continuation of application No. 17/701,459, filed on Mar. 22, 2022, now Pat. No. 11,706,120.

(51) Int. Cl.
*H04L 43/50* (2022.01)
*H04L 43/0817* (2022.01)
*H04L 43/106* (2022.01)

(52) U.S. Cl.
CPC .......... *H04L 43/50* (2013.01); *H04L 43/0817* (2013.01); *H04L 43/106* (2013.01)

(58) Field of Classification Search
CPC ... H04L 43/50; H04L 43/0817; H04L 43/106; H04L 41/22; H04L 41/145
See application file for complete search history.

(56) References Cited

U.S. PATENT DOCUMENTS

| | | | |
|---|---|---|---|
| 8,347,267 B2 | 1/2013 | Givoni et al. | |
| 2004/0260653 A1 | 12/2004 | Tsuei et al. | |
| 2011/0172960 A1 | 7/2011 | St. George et al. | |
| 2011/0202413 A1 * | 8/2011 | Stewart | |
| 2016/0306726 A1 * | 10/2016 | Regev | G06F 11/2205 |
| 2017/0012843 A1 * | 1/2017 | Zaidi, III | H04L 43/0858 |
| 2020/0250633 A1 * | 8/2020 | Vinson | G06Q 20/3676 |
| 2021/0099476 A1 * | 4/2021 | Montgomery | H04L 63/1425 |
| 2023/0344740 A1 * | 10/2023 | Peng | H04L 41/5003 |

* cited by examiner

*Primary Examiner* — Anh Nguyen
(74) *Attorney, Agent, or Firm* — Kaufman & Canoles, P.C.

(57) ABSTRACT

Systems and methods of performing automated testing using a process flow of messages are provided. In one exemplary embodiment, a method includes receiving an indication that represents a time stamped message that is sent or received by a second electronic node and that is associated with a certain function. The method also includes generating a process flow of messages between the set of electronic nodes for the certain function based on the time stamped message of the second electronic node that is associated with the certain function and time stamped messages of the other electronic nodes associated with the same function so that the first electronic node is operable to simulate the certain function specific to that node based on the process flow of messages so as to test that at least one electronic node is operable to perform the certain function in conformance with the process flow of messages.

20 Claims, 9 Drawing Sheets

400a

| BY A FIRST ELECTRONIC NODE OF A PLURALITY OF ELECTRONIC NODES THAT ARE ASSOCIATED WITH COLLECTIVELY PERFORMING A CERTAIN FUNCTION, WITH EACH ELECTRONIC NODE BEING OPERABLE TO OBTAIN TIME STAMPED MESSAGES THAT ARE SENT AND RECEIVED BY THAT ELECTRONIC NODE ASSOCIATED WITH THE CERTAIN FUNCTION, RECEIVING, FROM A SECOND ELECTRONIC NODE OF THE PLURALITY OF ELECTRONIC NODES, AN INDICATION THAT REPRESENTS A TIME STAMPED MESSAGE THAT IS SENT OR RECEIVED BY THE SECOND ELECTRONIC NODE AND THAT IS ASSOCIATED WITH THE CERTAIN FUNCTION | 401a |

↓

| GENERATING A PROCESS FLOW OF MESSAGES BETWEEN THE PLURALITY OF ELECTRONIC NODES FOR THE CERTAIN FUNCTION BASED ON THE TIME STAMPED MESSAGE OF THE SECOND NODE THAT IS ASSOCIATED WITH THE CERTAIN FUNCTION AND TIME STAMPED MESSAGES OF THE OTHER ELECTRONIC NODES ASSOCIATED WITH THE SAME FUNCTION SO THAT THE FIRST ELECTRONIC NODE IS OPERABLE TO SIMULATE THE CERTAIN FUNCTION SPECIFIC TO THAT NODE BASED ON THE PROCESS FLOW OF MESSAGES SO AS TO TEST THAT THE SECOND NETWORK NODE IS OPERABLE TO PERFORM THE CERTAIN FUNCTION SPECIFIC TO THAT NODE IN CONFORMANCE WITH THE PROCESS FLOW OF MESSAGES | 403a |
| AGGREGATING THE TIME STAMPED MESSAGE OF THE SECOND ELECTRONIC NODE THAT IS ASSOCIATED WITH THE CERTAIN FUNCTION WITH TIME STAMPED MESSAGES OF THE OTHER ELECTRONIC NODES THAT ARE ALSO ASSOCIATED WITH THE CERTAIN FUNCTION BASED ON A TIME STAMP INCLUDED WITH EACH MESSAGE TO OBTAIN AGGREGATED MESSAGES OF THE PLURALITY OF ELECTRONIC NODES THAT ARE ASSOCIATED WITH THE CERTAIN FUNCTION | 405a |
| MAPPING THE AGGREGATED MESSAGES BASED ON A SET OF SIMULATION OBJECTS ASSOCIATED WITH PERFORMING A SIMULATION OF THE CERTAIN FUNCTION TO OBTAIN THE PROCESS FLOW OF MESSAGES OF THE CERTAIN FUNCTION, WITH EACH SIMULATION OBJECT CORRESPONDING TO AN OPERATION PERFORMED BY AN ELECTRONIC NODE | 407a |

↓

| SENDING, BY THE FIRST ELECTRONIC NODE, TO THE SECOND ELECTRONIC NODE, AN INDICATION ASSOCIATED WITH THE PROCESS FLOW OF MESSAGES | 409a |

↓

| SIMULATING THE CERTAIN FUNCTION SPECIFIC TO THE FIRST ELECTRONIC NODE BASED ON THE PROCESS FLOW OF MESSAGES FOR THAT NODE | 411a |
| SENDING A FIRST MESSAGE OF THE PROCESS FLOW OF MESSAGES THAT IS SPECIFIC TO THE FIRST ELECTRONIC NODE AND IN ACCORDANCE WITH THE PROCESS FLOW OF MESSAGES. | 413a |

↓

| SETTING A TIMER FOR A PREDETERMINED TIME RESPONSIVE TO THE SENDING THE FIRST MESSAGE | 415a |

↓

| DETERMINING THAT AN ERROR EVENT HAS OCCURRED RESPONSIVE TO EXPIRATION OF THE TIMER FOR THE PREDETERMINED TIME PRIOR TO RECEIVING A THIRD MESSAGE THAT IS SPECIFIC TO THE FIRST ELECTRONIC NODE AND INDICATED AS FOLLOWING THE FIRST MESSAGE BY THE PROCESS FLOW OF MESSAGES | 417a |

↓

| OUTPUTTING, FOR DISPLAY BY A PROCESSING CIRCUIT, A FIRST REGION, A SECOND REGION AND A THIRD REGION OF A GRAPHICAL USER INTERFACE BASED ON THE PROCESS FLOW OF MESSAGES, WHEREIN: THE FIRST REGION INCLUDES A FIRST GRAPHICAL OBJECT THAT REPRESENTS THE FIRST ELECTRONIC NODE; THE SECOND REGION INCLUDES A SECOND GRAPHICAL OBJECT THAT REPRESENTS THE SECOND ELECTRONIC NODE; AND THE THIRD REGION IS SPATIALLY ALIGNED RELATIVE TO THE FIRST AND SECOND REGIONS AND INCLUDES A THIRD GRAPHICAL OBJECT THAT REPRESENTS A FIRST MESSAGE THAT IS COMMUNICATED BETWEEN THE FIRST AND SECOND ELECTRONIC NODES BASED ON THE PROCESS FLOW OF MESSAGES | 419a |

FIG. 4A

AUTOMATED PROCESS FLOW TESTING SYSTEM

CROSS REFERENCE TO RELATED APPLICATIONS

This application is a continuation of U.S. patent application Ser. No. 17/701,459, filed Mar. 22, 2022, which is hereby incorporated by reference as if fully set forth herein.

BACKGROUND

Behavior driven development is a methodology in which an application is documented and designed around the behavior a user expects to experience when interacting with the application. However, issues arise in using behavior driven development in a system where the user expectation of the system behavior does not correspond to the actual process flow of messages in that system. Accordingly, there is a need for improved techniques for performing automated testing using a process flow of messages such as for capturing test cases in systems having process flows of messages that differ from the user experience. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 4A illustrates one embodiment of a method of capturing and simulating test case(s) based on a process flow of messages for an electronic node network that collectively performs a certain function in accordance with various aspects as described herein.

DETAILED DESCRIPTION

Figure 1A:
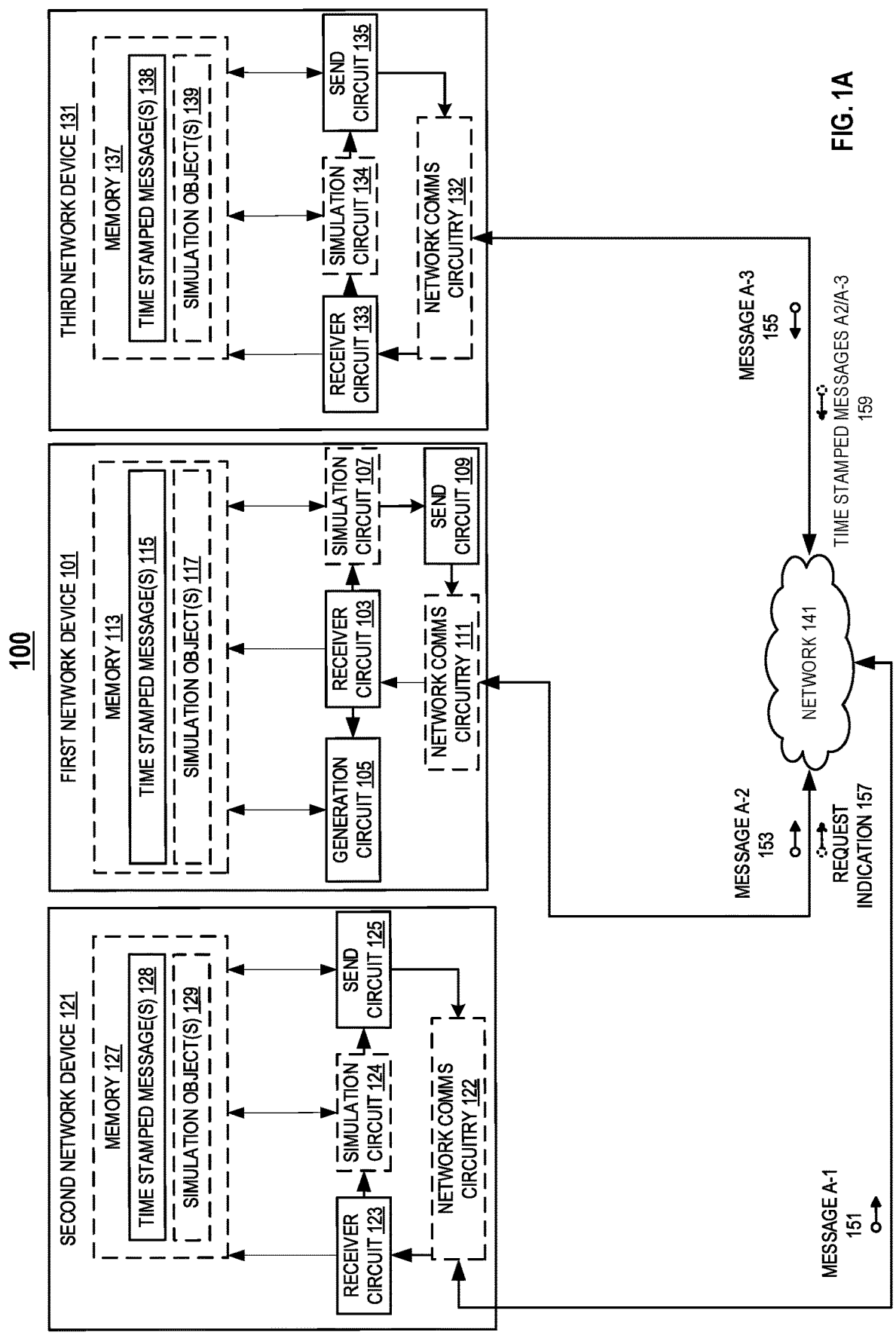
FIGS. 1A-B illustrate one embodiment of a system that generates and simulates test cases based on a process flow of messages associated with the behavior of an electronic node network collectively performing a certain function in accordance with various aspects as described herein.

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

Behavior driven development has traditionally been a beneficial methodology for capturing test cases for a system. In behavior driven development, a test case is created based on the user experience or expectation of the system and then used to perform testing of that system. As such, tests in behavior driven development are most often focused on the behavior of users experiencing the system rather than the technical functions of the system. However, there are many systems where the user experience does not necessarily correspond to the actual process flow of messages within that system (e.g., payment solution of a point of service device in the retail industry). To resolve, in one exemplary embodiment, an automated test solution is performed based on a generated process flow of messages that corresponds to a certain function collectively performed by the system. This approach not only meets the requirements of behavior driven development but also enables tests for those functions that have a complex process flow of messages in the system or that have a process flow of messages that does not correspond to the user experience of the system. The process flow of messages is generated by mapping the messages communicated between electronic nodes in the system when performing a certain function of the system. An electronic node in the system can then simulate the generated process flow of messages for that node by listening for and then responding with messages defined in the process flow of messages. By simulating the process flow of messages, other nodes in the system can be tested to verify their conformance with the process flow of messages.

Various embodiments of the present disclosure include an electronic node network. The electronic node network may include a set of electronic nodes. The set of electronic nodes are configured to collectively perform a certain function of the system by sending and receiving messages associated with that certain function. Additionally, embodiments of the present disclosure recognize that challenges exist in capturing test cases for simulating and testing certain functions performed by the set of electronic nodes using behavior driven development due to the user expectation of the system behavior being inconsistent with the actual process flow of messages in that system. The challenges exist because the process flow of messages between the electronic nodes do not follow an expected user process flow associated with performing the certain function. For example, a user experience for scanning an item for purchase using an electronic node (e.g., point of sale device) of an electronic node network may include process steps of inputting item information with the electronic node then displaying a price associated with the item information. A test case captured based on this behavior of the user experience would not account for test cases associated with a process flow of messages between electronic nodes that collectively perform backend functions associated with scanning the item. Thus, a test case generated based on a user experience that is associated with a higher process flow of messages (such as that found in a point-of-sale system when conducting a retail payment) would not provide adequate testing of the system.

Figure 1B:
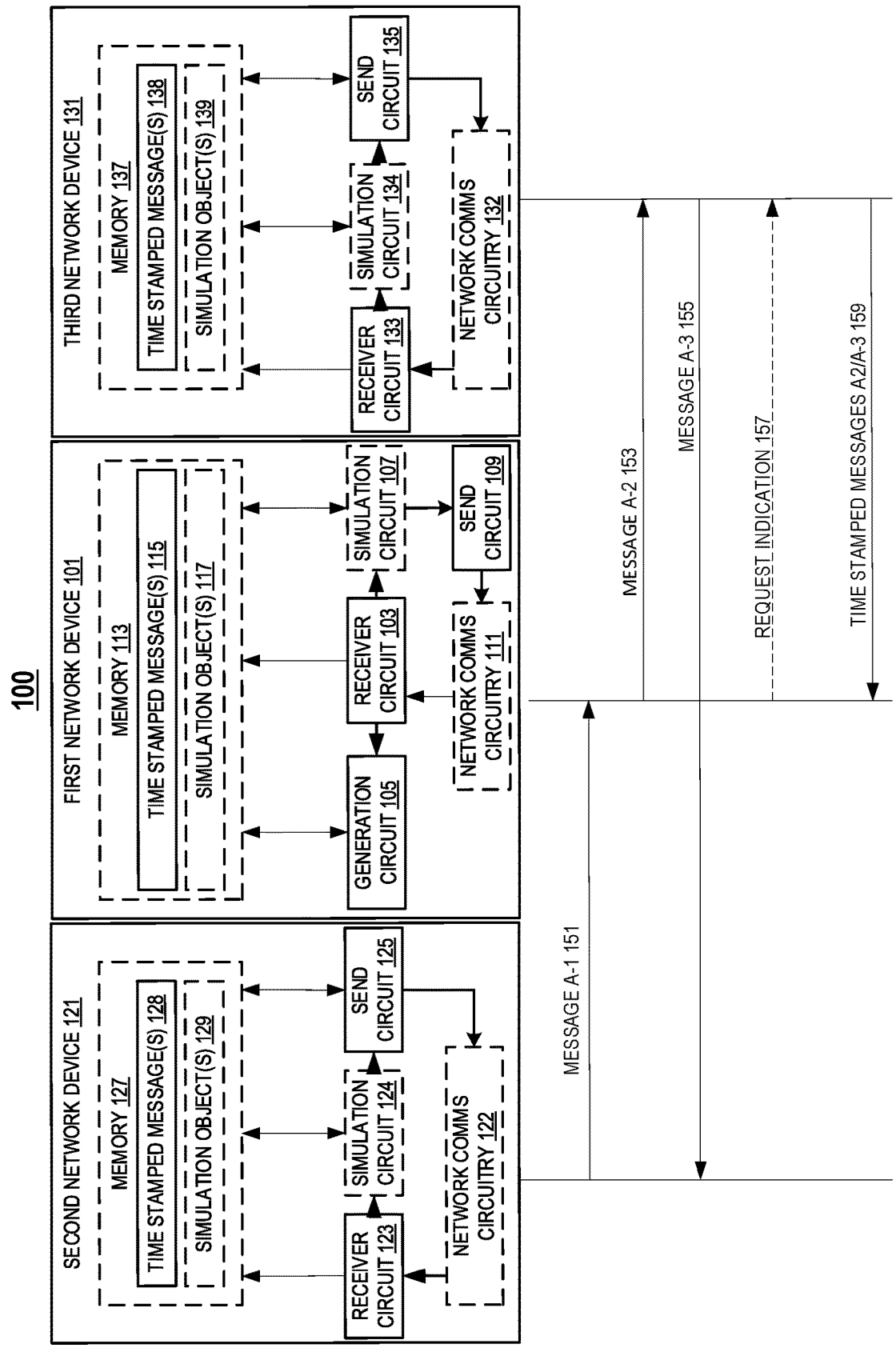

In the present disclosure, systems and methods of performing automated testing using a process flow of messages are provided. In one example, FIGS. 1A-B illustrate one embodiment of a system 100 that generates and simulates test cases based on a process flow of messages associated with a behavior of an electronic node network that collectively performs a certain function in accordance with various aspects as described herein. In FIGS. 1A-B, the system 100 includes a first electronic node 101, a second electronic node 121, and a third electronic node 131 (which may collectively be referred to as the "electronic nodes" or the "electronic node network"). The first electronic node 101 may include a receiver circuit 103, a generation circuit 105, a simulation circuit 107, a send circuit 109, a network communications circuity 111, a memory 113, or any combination thereof. The memory 113 includes time stamped message(s) 115 that represent a time-based log of messages sent or received by the first electronic node 101. A time stamped message includes both a message that is sent or received by an electronic node and a time stamp that represents a time in which that message was sent or received by the electronic node. Additionally, the time stamped message(s) 115 may include an aggregation of time stamped messages (sent or received) or logs of messages of the second electronic node 121 and the third electronic node 131. The memory 113 may include simulation object(s) 117. In one definition, a simulation object corresponds to a certain operation or function of a simulator (e.g., simulation circuit 107) or emulator that is required to simulate or emulate a process flow of messages such as described by FIG. 1C. In addition, each of the second and third electronic nodes 121, 131 may respectively include a receiver circuit 123, 133, a simulation circuit 124, 134, a send circuit 125, 135, a network communications circuity 122, 132, a memory 127, 137, or any combination thereof. Each memory 127, 137 includes time stamped message(s) 128, 138. Additionally, each memory 127, 137 may include simulation object(s) 129, 139.

In the current embodiment, the electronic nodes 101, 121, 131 may collectively perform a certain function by communicating messages between the electronic nodes 101, 121, 131. The electronic nodes 101, 121, 131 may communicate over a wired or wireless connection. In one example, some or all of the electronic nodes 101, 121, 131 can communicate over a wired connection (e.g., SPI, I2C, USB, Ethernet). In another example, some or all of the electronic nodes 101, 121, 131 can communicate via network 141 (e.g., Internet). In yet another example, some or all of the electronic nodes 101, 121, 131 can communicate over a peer-to-peer wireless connection (e.g., WiFi, Bluetooth, etc.). Portions of the network 141 may be implemented using a wide area network (WAN), such as the Internet, a local area network (LAN), such as a Bluetooth™ network or Wi-Fi™ and combinations or derivatives thereof.

In operation, the electronic nodes 101, 121, 131 collectively perform a certain function (e.g., retail payment by a point of sale system) which includes the second electronic node 121 sending a message A-1 151 to the first electronic node 101, then the first electronic node 101 sending a message A-2 153 to the third electronic node 131, and then finally the third electronic node 131 sending the message A-3 155 to the second electronic node 121. Further, each electronic node 101, 121, 131 applies a time stamp to each message sent and received by that electronic node 101, 121, 131 and maintains each time stamped message in a respective time stamped message log 115, 128, 138. After the certain function is collectively performed, the first electronic node 101 may send to the second electronic node 121 an indication 157 that requests time stamped message(s) of the second electronic node 121 that are associated with the certain function. In response, the first electronic node 101 receives from the second electronic node 121 the time stamped message(s) 159 of the second electronic node 121.

Furthermore, the first electronic node 101 then generates a process flow of messages (e.g., FIG. 1C) between the set of electronic nodes 101, 121, 131 for the certain function based on the time stamped message(s) 159 of the second electronic node 121 and a time stamped message of the first electronic node 101 that is also associated with the certain function. In generating the process flow of messages, the first electronic node 121 may aggregate the time stamped messages of the first and second electronic nodes 101, 121 based on the time stamp of each time stamped message to obtain aggregated messages of the set of electronic nodes 101, 121, 131 that are associated with the certain function. Further, the first electronic node 121 may map the aggregated messages based on a set of simulation objects that is associated with performing a simulation of the certain function by an electronic node to obtain the process flow of messages of the certain function. Each simulation object corresponds to a certain operation (e.g., send message, receive message, acknowledge message, etc.) of a simulation or emulation of a process flow of messages performed by an electronic node.

Moreover, the first electronic node 101 may simulate the certain function specific to the first electronic node 101 based on the process flow of messages to test that the second electronic node 121 is conforming to the process flow of messages. For example, the first electronic node 101 may send a first message of the process flow of messages that is specific to the first electronic node 101 to the second electronic node 121. Further, the first electronic node 101 may set a timer for a certain duration that exceeds a duration for which the first electronic node 101 is expected to receive a second message from the second electronic node 121 after sending the first message. The first electronic node 101 may determine that an error event has occurred responsive to the expiration of the timer for the certain duration and prior to receiving the second message.

Additionally or alternatively, the first electronic node 101 may receive the second message and may compare the content of the received second message with the content of the expected second message as defined by the process flow of messages. The first electronic node 101 may determine that an error event has occurred responsive to determining that the content of the received second message is different from the content of the expected second message.

Figure 1C:
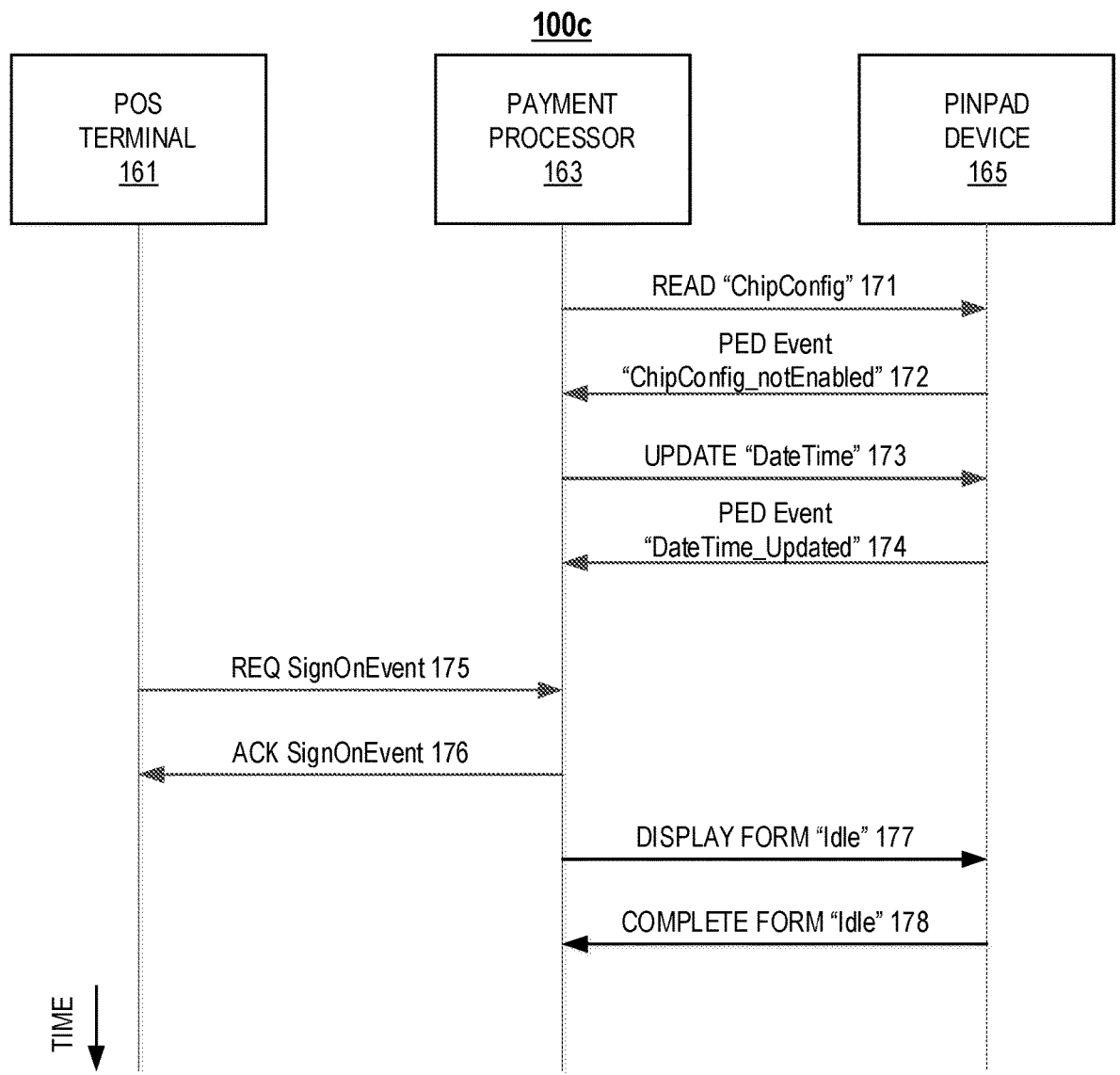
FIG. 1C illustrates one example of a process flow of messages in accordance with various aspects as described herein.

FIG. 1C illustrates one example of a process flow of messages in accordance with various aspects as described herein. In FIG. 1C, the system 100c includes a point of sale (POS) terminal 161, a payment processor 163, and a pinpad device 165 (which may collectively be referred to as the "payment devices" or the "point of service network"). In the current example, the payment devices 161, 163, 165 collectively perform certain functions (e.g., sign on events, portable electronic device (PED) events, etc.) by communicating messages between the payment devices 161, 163, 165. In operation, the payment devices 161, 163, 165 collectively perform the certain functions which includes the payment processor 163 sending a read message 171 to the pinpad device 165, then the payment processor 163 receiving a read response message 172 from the pinpad device 165. The read message 171 and the read response message 172 may include a time stamp and/or a function identifier, for example, "ChipConfig" and "ChipConfig_notEnabled" respectively. Additionally, the payment processor 163 sending an update message 173 to the pinpad device 165, then the payment processor 163 receiving an update response message 174 from the pinpad device 165. The update message 173 and the update response message 174 may include a time stamp and/or a function identifier, for example, "DateTime" and "DateTime_Updated" respectively. Also, the payment processor 163 receiving a request message 175 from the POS terminal 161, then sending an acknowledgement message 176 to the POS terminal 161. The request message 175 and the acknowledgement message 176 may include a time stamp and/or a function identifier, for example, "SignOnEvent". Furthermore, the payment processor 163 sending a form message 177 to the pinpad device 165, then the payment processor 163 receiving a form response message 178 from the pinpad device 165. The form message 177 and the form response message 178 may include a time stamp and/or a function identifier, for example, "Idle".

Figure 2A:
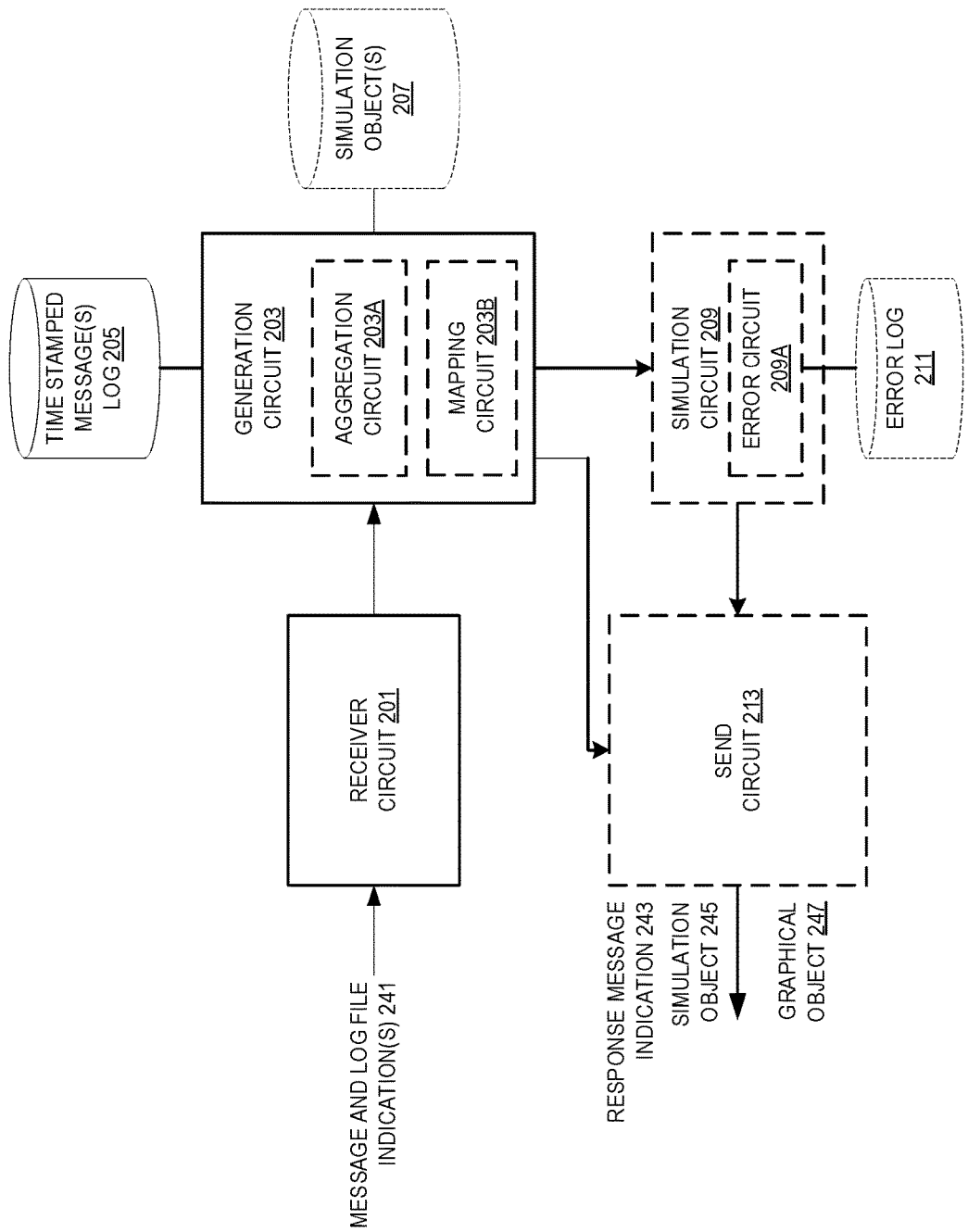
FIG. 2A illustrates one embodiment of a first electronic node device in accordance with various aspects as described herein.

FIG. 2A illustrates one embodiment of a first electronic node device 200a in accordance with various aspects as described herein. In FIG. 2A, the device 200a implements various functional means, units, or modules (e.g., via the processing circuitry 301a in FIG. 3A, via the processing circuitry 501 in FIG. 5, via software code, or the like), or circuits. In one embodiment, these functional means, units, modules, or circuits (e.g., for implementing the method(s) herein) may include for instance: a receiver circuit 201 operable to receive a message and log file indication(s) 241; a generation circuit 203 operable to generate a process flow of messages, a response message indication 243, a simulation object 245, and graphical object 247 associated with performing a certain function that is collectively performed by a set of electronic node devices; an aggregation circuit 203A operable to aggregate the message and log file indication(s) 241 associated with the certain function with time stamped messages of other electronic node devices of the set of electronic node devices that are also associated with the certain function; a mapping circuit 203B operable to map the aggregate messages associated with the certain function; a time stamped message(s) log 205 operable to store the message and log file indication(s) 241 and the aggregate messages the generation circuit 203 provides; a simulation object(s) log 207 operable to store simulation objects associated with performing a simulation of the certain function the generation circuit 203 provides; a simulation circuit 209 operable to perform the certain function specific to the device 200a and/or test the other electronic node devices associated with performing of the certain function; an error circuit 209A operable to determine an error event occurred responsive to determining expiration of a predetermined time prior to receiving an acknowledgement indication corresponding to a response message indication 243 or the simulation object 245 and/or responsive to determining an acknowledgement indication corresponding to the simulation object 245 does not conform with the process flow of messages; an error log 211 operable to store error events the simulation circuit 209A determines; a send circuit 213 operable to send the response message indication 243 or the simulation 245 to the electronic node device that sent the message and log file indication(s) 241 or other electronic node device associated with performing the certain function and/or the graphical object 247 to a display.

Figure 2B:
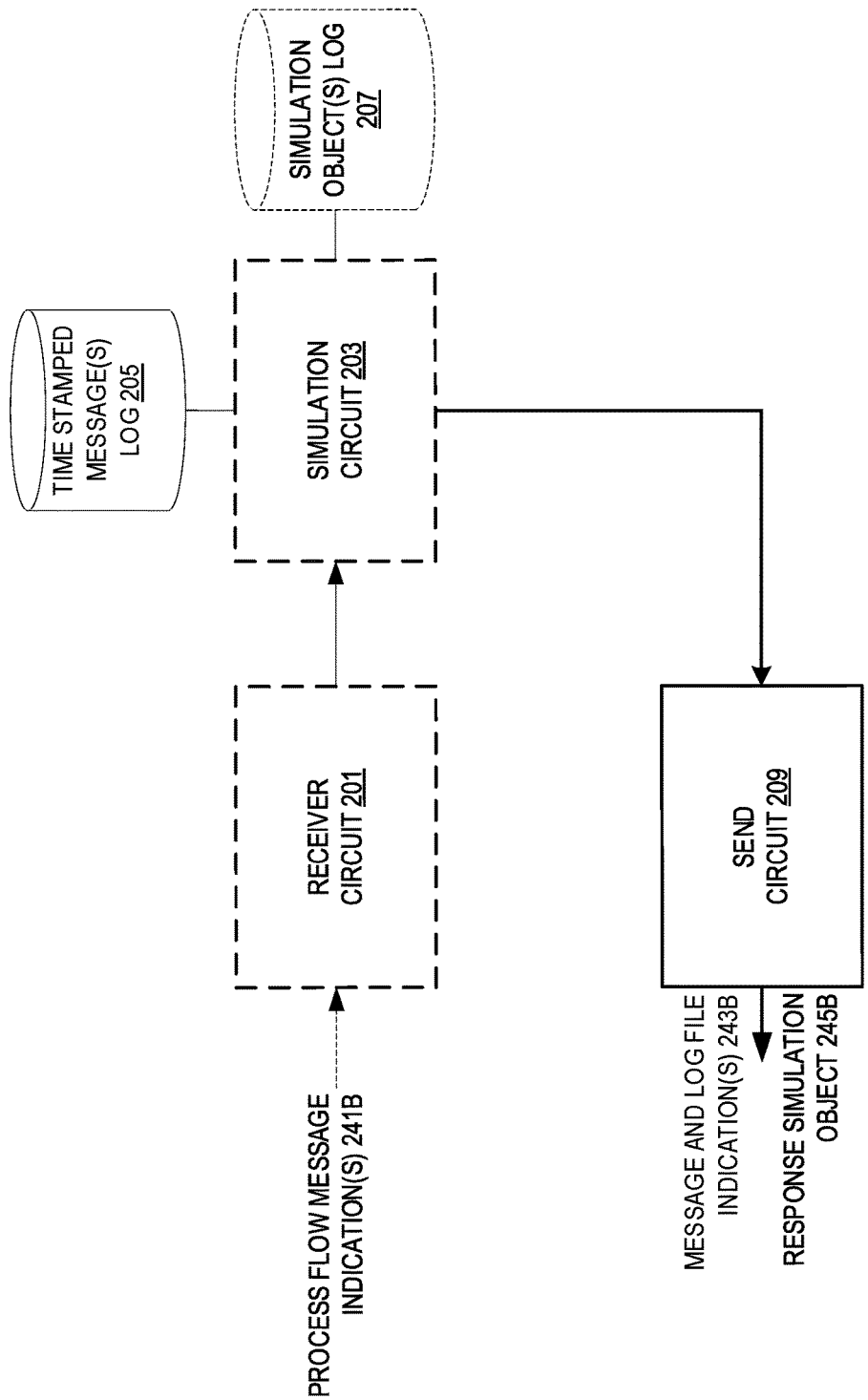
FIG. 2B illustrates one embodiment of a second electronic node device in accordance with various aspects as described herein.

FIG. 2B illustrates one embodiment of a second electronic node device 200b in accordance with various aspects as described herein. In FIG. 2AB, the device 200b implements various functional means, units, or modules (e.g., via the processing circuitry 301a in FIG. 3A, via the processing circuitry 501 in FIG. 5, via software code, or the like), or circuits. In one embodiment, these functional means, units, modules, or circuits (e.g., for implementing the method(s) herein) may include for instance: a receiver circuit 201 operable to receive a process flow message indication 241B; a simulation circuit 203 operable to generate a response simulation object 245B and/or test other electronic node devices associated with performing a certain function that is collectively performed; a time stamped message(s) log 205 operable to store message updates the simulation circuit 203 provides; a simulation object(s) log 207 operable to store simulation object the simulation circuit 203 utilizes to generate the response simulation object 245B; a send circuit 209 operable to send, to an electronic node device that sent the process flow message 241B or another electronic node device associated with performing the certain function, a message and log file indication(s) 243B or the response simulation object 245B.

Figure 3C:
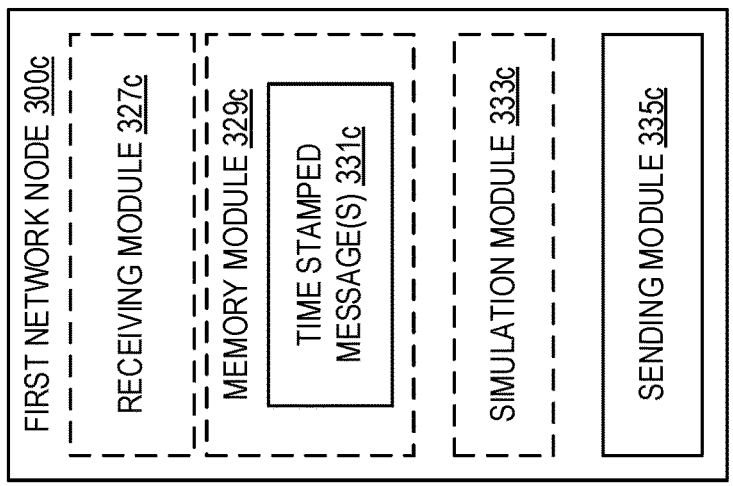
FIGS. 3A-C illustrate other embodiments of an electronic node device in accordance with various aspects as described herein.
Figure 3B:
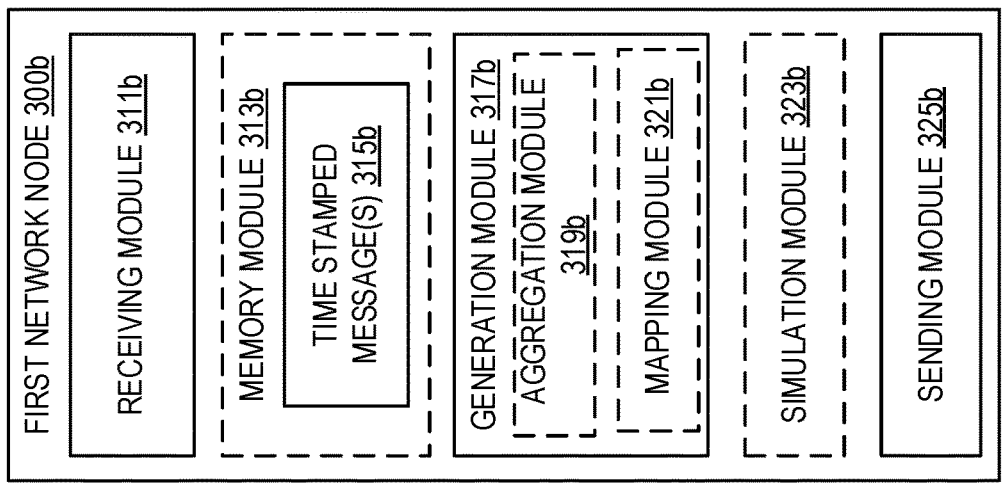
Figure 3A:
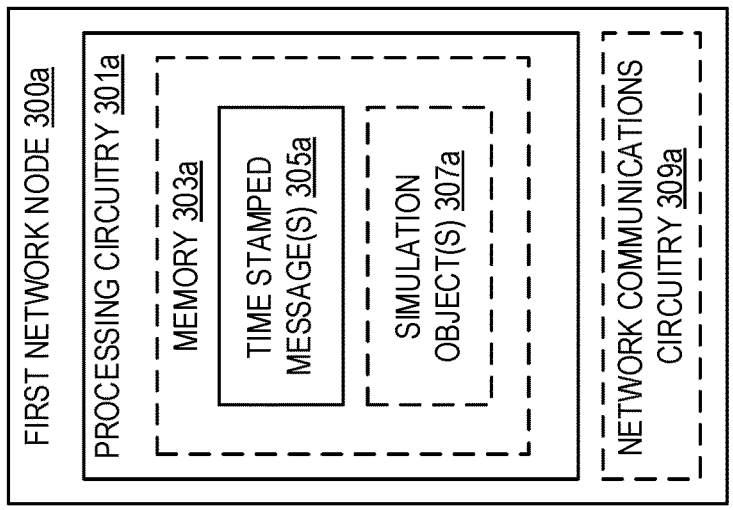

FIGS. 3A-C illustrate other embodiments of an electronic node device 300a-c in accordance with various aspects as described herein. In FIG. 3A, the device 300a may include processing circuitry 301a that is operably coupled to one or more of the following: memory 303a, time stamped message(s) 305a, simulation object(s) 307a, network communications circuitry 309a, the like, or any combination thereof. The network communication circuitry 309a is configured to transmit and/or receive information to and/or from one or more other electronic node devices via any communication technology. The processing circuitry 301a is configured to perform processing described herein, such as by executing instructions stored in memory 303a. The processing circuitry 301a in this regard may implement certain functional means, units, or modules. The time stamped message(s) 305a is configured to store log files that may include time stamped messages, aggregated time stamped messages one or more other electronic node devices, electronic node identifiers of the time stamped messages, and function identifiers of the time stamped messages sent and received by the first electronic node device 300a while performing a certain function that is collectively performed. The simulation object(s) 307a is configured to store one or more simulation objects associated with simulating the certain function specific to the device 300a.

Figure 5:
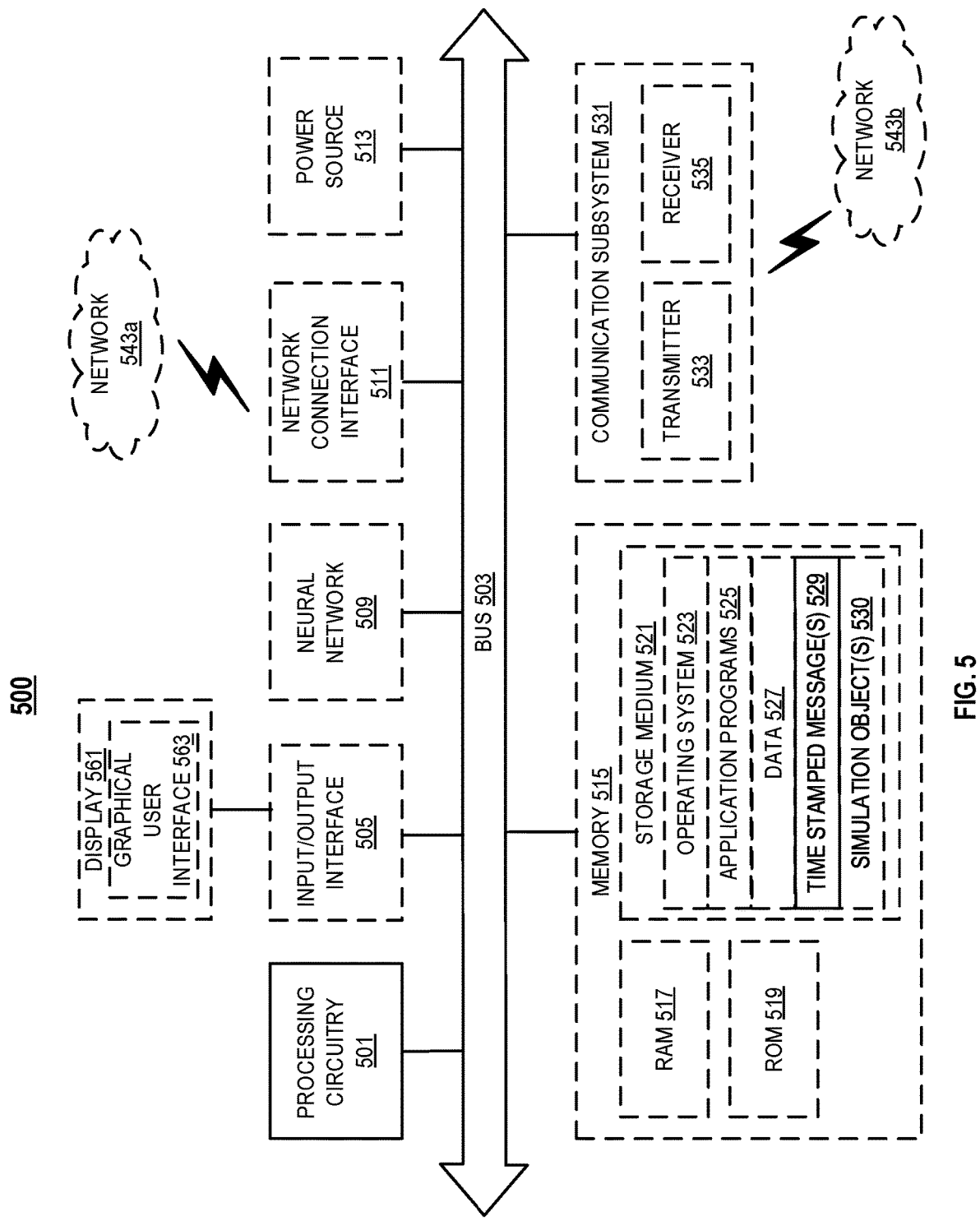
FIG. 5 illustrates another embodiment of an electronic node device in accordance with various aspects as described herein.

In FIG. 3B, the device 300b implements various functional means, units, or modules (e.g., via the processing circuitry 301a in FIG. 3A, via the processing circuitry 501 in FIG. 5, via software code, or the like). In one embodiment, these functional means, units, or modules (e.g., for implementing the method(s) described herein) may include for instance: a receiving module 311b for receiving, from a second electronic node of the set of electronic nodes, an indication that represents a time stamped message that is sent or received by the second electronic node and that is associated with the certain function; a memory module 313b for storing time stamped message(s) 315b sent or received by the device 300b; a generation module 317b for generating a process flow of messages between the set of electronic nodes for the certain function; an aggregation module 319*b* for aggregating the time stamped message of the second electronic node that is associated with the certain function with time stamped messages and/or identifiers of the other electronic nodes that are also associated with the certain function; a mapping module 321*b* for mapping the aggregated messages; a simulation module 323*b* for simulating the certain function specific to the device 300*b* based on the process flow of messages for the device 300*b*; a sending module 325*b* for sending, by the device 300*b*, to the second electronic node, an indication associated with the process flow of messages.

In FIG. 3C, the device 300*c* implements various functional means, units, or modules (e.g., via the processing circuitry 301*a* in FIG. 3A, via the processing circuitry 501 in FIG. 5, via software code, or the like). In one embodiment, these functional means, units, or modules (e.g., for implementing the method(s) described herein) may include for instance: a receiving module 327*c* for receiving, from a first electronic node of the set of electronic nodes, an indication associated with a process flow of messages; a memory module 329*c* for storing time stamped message(s) 331*c* sent or received by the device 300*c*; a simulation module 333*c* for simulating the certain function specific to the device 300*b* based on the process flow of messages for the device 300*b*; a sending module 335*c* for sending, by the device 300*c*, to a first electronic node of the set of electronic nodes, an indication that represents a time stamped message that is sent or received by the device 300*c* and that is associated with the certain function.

FIG. 4A illustrates one embodiment of a method 400*a* of simulating and capturing test case(s) for an electronic node network collectively performing a certain function of an application to automate software verification of the application in accordance with various aspects as described herein. In FIG. 4A, the method 400*a* may include a first electronic node of a set of electronic nodes that are associated with collectively performing a certain function, with each electronic node being operable to obtain time stamped messages that are sent and received by that electronic node associated with the certain function. At block 401*a*, the method 400*a* includes receiving, from a second electronic node of the set of electronic nodes, an indication that represents a time stamped message that is sent or received by the second electronic node. Also, the indication is associated with the certain function.

At block 403*a*, the method 400*a* includes generating a process flow of messages between the set of electronic nodes for the certain function. The process flow of messages is based on the time stamped message of the second node that is associated with the certain function and time stamped messages of the other electronic nodes associated with the same function. The first electronic node is operable to simulate the certain function specific to the first electronic node based on the process flow of messages and test that the second electronic node is operable to perform the certain function specific to the second electronic node in conformance with the process flow of messages.

Additionally, at block 405*a*, the method 400*a* includes aggregating the time stamped message of the second electronic node that is associated with the certain function with time stamped messages of the other electronic nodes that are also associated with the certain function. The aggregating based on a time stamp included with each message to obtain aggregated messages of the set of electronic nodes that are associated with the certain function. Also, the method 400*a* may include aggregating the time stamped message of the electronic node associated with the certain function based on an electronic node identifier included with each message that identifies one of the set of electronic nodes that sent or received that message. Furthermore, the method 400*a* may include aggregating the time stamped message of the electronic node associated with the certain function based on a function identifier included with each message that identifies the certain function associated with that message.

In addition, at block 407*a*, the method 400*a* includes mapping the aggregated messages based on a set of simulation objects. The set of simulation objects are associated with performing a simulation of the certain function to obtain the process flow of messages of the certain function. Each simulation object corresponds to an operation performed by an electronic node. The operation may be associated with sending or receiving a message by an electronic node. At block 409*a*, the method 400*a* includes sending, by the first electronic node, to the second electronic node, an indication associated with the process flow of messages.

At block 411*a*, the method 400*a* includes simulating the certain function specific to the first electronic node based on the process flow of messages for that node. Additionally, at block 413*a*, the method 400*a* includes simulating the certain function by sending a first message of the process flow of messages that is specific to the first electronic node and in accordance with the process flow of messages. Also, sending the first message may be responsive to receiving a second message that is specific to the first electronic node and indicated as preceding the first message by the process flow of messages.

At block 415*a*, the method 400*a* includes setting a timer for a predetermined time responsive to the sending the first message. Additionally, at block 417*a*, the method 400*a* includes determining that an error event has occurred responsive to expiration of the timer for the predetermined time prior to receiving a third message that is specific to the first electronic node and indicated as following the first message by the process flow of messages.

At block 419*a*, the method 400*a* includes outputting, for display by a processing circuit, a first region, a second region, and a third region of a graphical user interface based on the process flow of messages. The first region may include a first graphical object that represents the first electronic node. The second region may include a second graphical object that represents the second electronic node. The third region may include a third graphical object that represents a first message that is communicated between the first and second electronic nodes based on the process flow of messages. Further, the third region may be spatially aligned relative to the first and second regions. Additionally, the method 400*a* may include outputting a fourth region of the graphical user interface a fourth graphical object that represents a second message that is communicated between the first and second electronic nodes based on the process flow of messages. Additionally, the fourth region may be spatially aligned relative to the first, second, and third regions.

Figure 4B:
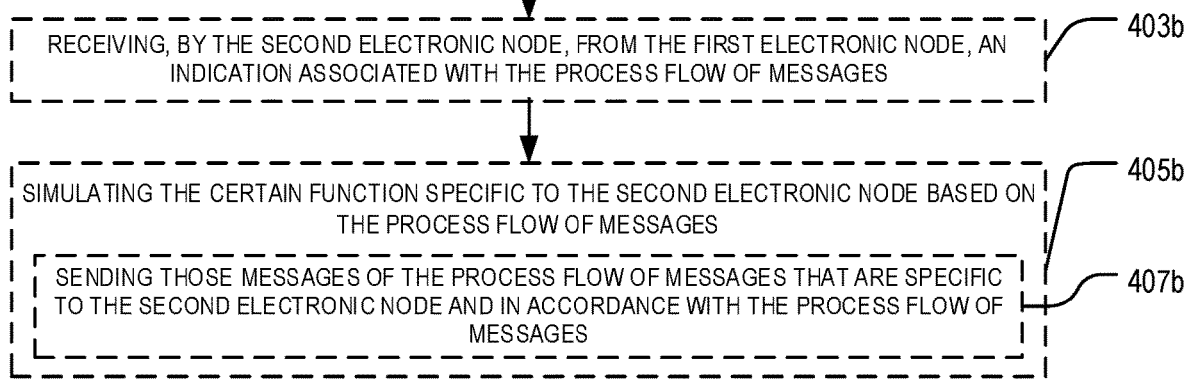
FIG. 4B illustrates another embodiment of a method of capturing and simulating test case(s) based on a process flow of messages for an electronic node network that collectively performs a certain function in accordance with various aspects as described herein.

FIG. 4B illustrates one embodiment of a method 400*b* of simulating and capturing test case(s) for an electronic node network collectively performing a certain function of an application to automate software verification of the application in accordance with various aspects as described herein. In FIG. 4B, the method 400*b* may include a second electronic node of a set of electronic nodes that are associated with collectively performing a certain function, with each electronic node being operable to obtain time stamped messages that are sent and received by that electronic node associated with the certain function. At block 401b, the method 400b includes sending, by the second electronic node, to a first electronic node of the set of electronic nodes, an indication that represents a time stamped message that is sent or received by the second electronic node and that is associated with the certain function. The first electronic node is operable to generate a process flow of messages between the set of electronic nodes for the same function based on the time stamped message of the second node that is associated with the certain function and time stamped messages of the other electronic nodes associated with the same function so as to enable at least one electronic node that is operable to simulate the certain function specific to that node based on the process flow of messages. At block 403b, the method 400b includes receiving, by the second electronic node, from the first electronic node, an indication associated with the process flow of messages. At block 405b, the method 400b includes simulating the certain function specific to the second electronic node based on the process flow of messages. Additionally, at block 407b, the method 400b includes simulating the certain function by sending those messages of the process flow of messages that are specific to the second electronic node and in accordance with the process flow of messages.

FIG. 5 illustrates another embodiment of an electronic node device 500 in accordance with various aspects as described herein. In FIG. 5, the device 500 includes processing circuitry 501 that is operatively coupled to input/output interface 505, neural network circuit 509, network connection interface 511, power source 513, memory 515 including random access memory (RAM) 517, read-only memory (ROM) 519, and storage medium 521 or the like, communication subsystem 531, transmitter 533, receiver 535, display 561, graphical user interface 563, and/or any other component, or any combination thereof. Storage medium 521 includes operating system 523, application program 525, data 527, time stamped message(s) 529, and simulation object(s) 530. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. The device 500 may be configured to use an output device (e.g., the display 561) via input/output interface 505. An output device may use the same type of interface port as an input device. For example, a USB port may be used to provide input to and output from the device 500. The output device may be a speaker, a sound card, a video card, a display, a monitor, a printer, an actuator, an emitter, a smartcard, another output device, or any combination thereof. The device 500 may be configured to use an input device via input/output interface 505 to allow a user to capture information into the device 500. The input device may include a touch-sensitive or presence-sensitive display, a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof.

In FIG. 5, the neural network 509 may be configured to learn to perform tasks by considering examples. The network connection interface 511 may be configured to provide a communication interface to network 543a. The network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as a widget or gadget engine or another application, a data file 527, time stamped message(s) 529, and simulation object(s) 530. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS)

optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500 to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The display 561 may be configured to provide a visual output to a user, for example, via a graphical user interface 563. The graphical user interface 563 may include graphical elements or indicators (for example, fixed or animated icons), lights, colors, text, images, combinations of the foregoing. The graphical user interface 563 displayed on the display 561 is, in one example, generated by the processing circuitry 501, from instructions and data stored in the memory 515.

In FIG. 5, the processing circuitry 501 may be configured to communicate with network 543b using the communication subsystem 531. The network 543a and the network 543b may be the same network or networks or different network or networks. The communication subsystem 531 may be configured to include one or more transceivers used to communicate with the network 543b. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543b may encompass wired and/or wireless networks such as a local-area network (LAN), a wide-area network (WAN), a computer network, a wireless network, a telecommunications network, another like network or any combination thereof. For example, the network 543b may be a cellular network, a Wi-Fi network, and/or a near-field network. The power source 513 may be configured to provide alternating current (AC) or direct current (DC) power to components of the device 500.

The features, benefits and/or functions described herein may be implemented in one of the components of the device 500 or partitioned across multiple components of the device 500. Further, the features, benefits, and/or functions described herein may be implemented in any combination of hardware, software or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method comprises, by a first electronic node of a set of electronic nodes that are associated with collectively performing a certain function, with each electronic node being operable to obtain time stamped messages that are sent and received by that electronic node associated with the certain function, receiving, from a second electronic node of the set of electronic nodes, an indication that represents a time stamped message that is sent or received by the second electronic node and that is associated with the certain function. Additionally, the method comprises, generating a process flow of messages between the set of electronic nodes for the certain function based on the time stamped message of the second electronic node that is associated with the certain function and time stamped messages of the other electronic nodes associated with the same function so that the first electronic node is operable to simulate the certain function specific to that node based on the process flow of messages so as to test that the second electronic node is operable to perform the certain function specific to that node in conformance with the process flow of messages.

In another exemplary embodiment, the method further includes generating a process flow of messages by aggregating the time stamped message of the second electronic node that is associated with the certain function with time stamped messages of the other electronic nodes that are also associated with the certain function based on a time stamp included with each message to obtain aggregated messages of the set of electronic nodes that are associated with the certain function.

In another exemplary embodiment, the aggregating is further based on an electronic node identifier included with each message that identifies one of the set of electronic nodes that sent or received that message.

In another exemplary embodiment, the aggregating is further based on a function identifier included with each message that identifies the certain function associated with that message.

In another exemplary embodiment, the method further includes generating a process flow of messages by mapping the aggregated messages based on a set of simulation objects associated with performing a simulation of the certain function to obtain the process flow of messages of the certain function, with each simulation object corresponding to an operation performed by an electronic node.

In another exemplary embodiment, one operation is associated with sending or receiving a message by an electronic node.

In another exemplary embodiment, the method further includes sending, by the first electronic node, to the second electronic node, an indication associated with the process flow of messages.

In another exemplary embodiment, the method further includes simulating the certain function specific to the first electronic node based on the process flow of messages for that node.

In another exemplary embodiment, the method further includes simulating the certain function specific to the first electronic node by sending a first message of the process flow of messages that is specific to the first electronic node and in accordance with the process flow of messages.

In another exemplary embodiment, the sending the first message is responsive to receiving a second message that is specific to the first electronic node and indicated as preceding the first message by the process flow of messages.

In another exemplary embodiment, the method further includes setting a timer for a predetermined time responsive to the sending the first message. Additionally, the method further includes determining that an error event has occurred responsive to expiration of the timer for the predetermined time prior to receiving a third message that is specific to the first electronic node and indicated as following the first message by the process flow of messages.

In another exemplary embodiment, each time stamped message includes an identifier of an electronic node that sent or received that message.

In another exemplary embodiment, each time stamped message includes a time stamp corresponding to a time in which an electronic node sent or received that message.

In another exemplary embodiment, the first electronic node is a point of sale device operable to perform a retail payment, the second electronic device is an input device operable to receive a user pin associated with the retail payment, and the certain function is associated with performing a retail payment.

In another exemplary embodiment, the method further includes outputting, for display by a processing circuit, a first region, a second region and a third region of a graphical user interface based on the process flow of messages, wherein: the first region includes a first graphical object that represents the first electronic node; the second region includes a second graphical object that represents the second electronic node; and the third region is spatially aligned relative to the first and second regions and includes a third graphical object that represents a first message that is communicated between the first and second electronic nodes based on the process flow of messages.

In another exemplary embodiment, the outputting further includes outputting a fourth region of the graphical user interface, with the fourth region being spatially aligned relative to the first, second, and third regions and includes a fourth graphical object that represents a second message that is communicated between the first and second electronic nodes based on the process flow of messages.

In one exemplary embodiment, a first electronic node of a set of electronic nodes that are associated with collectively performing a certain function comprises, processing circuitry and a memory, the memory comprising instructions executable by the processing circuitry whereby the processing circuitry is configured to, receive, from a second electronic node of the set of electronic nodes, an indication that represents a time stamped message that is sent or received by the second electronic node and that is associated with the certain function. Further, each electronic node being operable to obtain time stamped messages that are sent and received by that electronic node associated with the certain function. Additionally, the processing circuitry is configured to generate a process flow of messages between the set of electronic nodes for the certain function based on the time stamped message of the second electronic node that is associated with the certain function and time stamped messages of the other electronic nodes associated with the same function so that the first electronic node is operable to simulate the certain function specific to that node based on the process flow of messages so as to test that the second electronic node is operable to perform the certain function specific to that node in conformance with the process flow of messages.

In one exemplary embodiment, a method comprises, a second electronic node of a set of electronic nodes that are associated with collectively performing a certain function, with each electronic node being operable to obtain time stamped messages that are sent and received by that electronic node associated with the certain function, sending, by the second electronic node, to a first electronic node of the set of electronic nodes, an indication that represents a time stamped message that is sent or received by the second electronic node and that is associated with the certain function so that the first electronic node is operable to generate a process flow of messages between the set of electronic nodes for the same function based on the time stamped message of the second node that is associated with the certain function and time stamped messages of the other electronic nodes associated with the same function so as to enable at least one electronic node that is operable to simulate the certain function specific to that node based on the process flow of messages.

In another exemplary embodiment, the method further includes receiving, by the second electronic node, from the first electronic node, an indication associated with the process flow of messages.

In another exemplary embodiment, the method further includes simulating the certain function specific to the second electronic node based on the process flow of messages.

In another exemplary embodiment, the method further includes simulating the certain function specific to the second electronic node by sending those messages of the process flow of messages that are specific to the second electronic node and in accordance with the process flow of messages.

In one exemplary embodiment, a second electronic node of a set of electronic nodes that are associated with collectively performing a certain function comprising, processing circuitry and a memory, the memory comprising instructions executable by the processing circuitry whereby the processing circuitry is configured to send, to a first electronic node of the set of electronic nodes, an indication that represents a time stamped message that is sent or received by the second electronic node and that is associated with the certain function so that the first electronic node is operable to generate a process flow of messages between the set of electronic nodes for the same function based on the time stamped message of the second node that is associated with the certain function and time stamped messages of the other electronic nodes associated with the same function so as to enable at least one electronic node that is operable to simulate the certain function specific to that node based on the process flow of messages. Further, each electronic node being operable to obtain time stamped messages that are sent and received by that electronic node associated with the certain function.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
by a first electronic node communicatively coupled to a second electronic node, with the first and second electronic nodes being configured to jointly perform a certain function, with each electronic node being operable to communicate a time stamped message having a message and a time stamp that indicates a time in which that time stamped message was communicated, with a process flow of messages that corresponds to time stamped messages communicated between the first and second electronic nodes for jointly performing the certain function being obtained based on the time stamped messages and a set of simulation objects configured to simulate the process flow of messages specific to the first electronic node, each simulation object corresponding to an operation performed by an electronic node including at least one of sending a message, receiving a message, or acknowledging a message, and the set of simulation objects being associated with performing a simulation of the certain function by an electronic node, in response to receiving, by the first electronic node, a preceding message that is specific to the first electronic node and indicated by the process flow of messages as preceding a first message, sending, by the first electronic node as part of a simulation routine derived from the set of simulation objects, to the second electronic node, the first message of the process flow of messages;

setting, by the first electronic node, a timer for a predetermined time as indicated by the process flow of messages responsive to the sending of the first message;

determining that a first error event has occurred responsive to expiration of the timer prior to receiving, by the first electronic node, a next message that is indicated by the process flow of messages as following the first message; and when the next message is received, comparing content of the received next message with content of an expected next message as defined by the process flow of messages, and determining that a second error event has occurred responsive to determining that the content differs from the expected content.

2. The method of claim 1, further comprising:
obtaining the process flow of messages based on the time stamped messages and the set of simulation objects.

3. The method of claim 1, further comprising:
aggregating the messages of the time stamped messages based on the time stamps of the time stamped messages.

4. The method of claim 3, wherein the aggregating step is further based on an electronic node identifier that identifies an electronic node as having sent or received a certain time stamped message, with each time stamped message having the electronic node identifier.

5. The method of claim 3, wherein the aggregating step is further based on a function identifier that identifies the certain function, with each time stamped message having the function identifier.

6. The method of claim 1, further comprising:
mapping the messages that correspond to the time stamped messages based on the time stamped messages and the set of simulation objects.

7. The method of claim 1, wherein the first message sending step is responsive to receiving, by the first electronic node, from the second electronic node, a second message, with the process flow of messages being configured to enable the first message sending step responsive to the second message receiving step.

8. The method of claim 1, further comprising:
setting a timer for a predetermined time responsive to the first message sending step; and
determining that an error event has occurred responsive to expiration of the timer for the predetermined time and prior to receiving, by the first electronic node, from the second electronic node, a third message, with the process flow of messages being configured to enable the setting step and the determining step.

9. The method of claim 1, wherein each time stamped message includes an identifier of an electronic node that sent or received that time stamped message.

10. The method of claim 1, wherein each time stamped message includes the time stamp corresponding to a time in which an electronic node sent or received that time stamped message.

11. The method of claim 1, wherein the first electronic node is a point of sale device operable to perform a retail payment, the second electronic device is an input device operable to receive a user pin associated with the retail payment, and the certain function is associated with performing the retail payment.

12. The method of claim 1, further comprising:
outputting, for display, a first region, a second region and a third region of a graphical user interface based on the process flow of messages, wherein:
the first region includes a first graphical object that represents the first electronic node;
the second region includes a second graphical object that represents the second electronic node; and
the third region is spatially aligned relative to the first and second regions and includes a third graphical object that represents the first message.

13. A first electronic node, comprising:
with the first electronic node being communicatively coupled to a second electronic node, with the first and second electronic nodes being configured to jointly perform a certain function, with each electronic node being operable to communicate a time stamped message having a message and a time stamp that indicates a time in which that time stamped message was communicated, with a process flow of messages that corresponds to time stamped messages communicated between the first and second electronic nodes for jointly performing the certain function being obtained based on the time stamped messages and a set of simulation objects configured to simulate the process flow of messages specific to the first electronic node, each simulation object corresponding to an operation performed by an electronic node including at least one of sending a message, receiving a message, or acknowledging a message, and the set of simulation objects being associated with performing a simulation of the certain function by an electronic node; and processing circuitry and a memory, the memory comprising instructions executable by the processing circuitry whereby the processing circuitry is configured to:
in response to receiving a preceding message that is specific to the first electronic node and indicated by the process flow of messages as preceding a first message, send, to the second electronic node as part of a simulation routine derived from the set of simulation objects, the first message of the process flow of messages;
set a timer for a predetermined time as indicated by the process flow of messages responsive to the sending of the first message;
determine that a first error event has occurred responsive to expiration of the timer prior to receiving a next message that is indicated by the process flow of messages as following the first message; and
when the next message is received, compare content of the received next message with content of an expected next message as defined by the process flow of messages, and determine that a second error event has occurred responsive to determining that the content differs from the expected content.

14. The first electronic device of claim 13, wherein the memory includes further instructions executable by the processing circuitry whereby the processing circuitry is configured to:
   obtain the process flow of messages based on the time stamped messages and the set of simulation objects.

15. The first electronic device of claim 13, wherein the memory includes further instructions executable by the processing circuitry whereby the processing circuitry is configured to:
   aggregate the messages of the time stamped messages based on the time stamps of the time stamped messages.

16. The first electronic device of claim 13, wherein the memory includes further instructions executable by the processing circuitry whereby the processing circuitry is configured to:
   aggregate the messages of the time stamped messages based on the time stamps of the time stamped messages and an electronic node identifier that identifies an electronic node as having sent or received a certain time stamped message, with each time stamped message having the electronic node identifier.

17. The first electronic device of claim 13, wherein the memory includes further instructions executable by the processing circuitry whereby the processing circuitry is configured to:
   aggregate the messages of the time stamped messages based on the time stamps of the time stamped messages and a function identifier that identifies the certain function, with each time stamped message having the function identifier.

18. The first electronic device of claim 13, wherein the memory includes further instructions executable by the processing circuitry whereby the processing circuitry is configured to:
   map the messages that correspond to the time stamped messages based on the time stamped messages and the set of simulation objects.

19. The first electronic device of claim 13, wherein the memory includes further instructions executable by the processing circuitry whereby the processing circuitry is configured to:
   receive, from the second electronic node, a second message responsive to the first message sending step, with the process flow of messages being configured to enable the first message sending step responsive to the second message receiving step.

20. The first electronic device of claim 13, wherein the memory includes further instructions executable by the processing circuitry whereby the processing circuitry is configured to:
   set a timer for a predetermined time responsive to the first message sending step; and
   determine that an error event has occurred responsive to expiration of the timer for the predetermined time and prior to receiving, by the first electronic node, from the second electronic node, a third message, with the process flow of messages being configured to enable the setting step and the determining step.

* * * * *